US006262212B1

(12) United States Patent
Yeung et al.

(10) Patent No.: US 6,262,212 B1
(45) Date of Patent: Jul. 17, 2001

(54) PROCESS FOR MANUFACTURING HOMOPOLYMERS AND COPOLYMERS OF DIMETHYLAMINOETHYL(METH) ACRYLATE

(75) Inventors: Dominic W. K. Yeung; Richard E. Rice, both of Mississauga (CA)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 09/244,359

(22) Filed: Feb. 4, 1999

Related U.S. Application Data

(60) Provisional application No. 60/112,608, filed on Dec. 17, 1998, and provisional application No. 60/103,100, filed on Oct. 5, 1998.

(51) Int. Cl.[7] .................................................. C08F 120/10
(52) U.S. Cl. ........................ 526/328; 526/319; 526/329.7
(58) Field of Search ..................................... 526/319, 328, 526/329.7

(56) References Cited

U.S. PATENT DOCUMENTS

| 2,840,550 | 6/1958 | Price et al. .......................... 260/80.5 |
| 4,129,534 | 12/1978 | Cunningham .......................... 521/38 |
| 4,877,546 | 10/1989 | Lai ................................. 252/174.17 |
| 4,879,051 | 11/1989 | Lo et al. ............................. 252/8.75 |
| 5,719,118 | 2/1998 | Crutcher et al. ..................... 510/499 |
| 5,723,111 | 3/1998 | Glover et al. ....................... 424/70.1 |

FOREIGN PATENT DOCUMENTS 27 49 295A1  8/1978 (DE).
56-141807A2  5/1984 (JP).

OTHER PUBLICATIONS

Search Report in PCT/US99/21760, Which is a CounterPart of U.S. Serial No. 09/244,359.
S. Creutz et al., "Living Anionic Homopolymerization and Block Copolymerization of (Dimethylamino)Ethyl Methacrylate", *Macromolecules*, vol. 30, pp. 6–9 (1997).
Y. Merle, Determinatin of Relative Rate Constants of Hydrolysis of Poly[(Dimethylamino)Ethyl Methacrylate], *Macromolecules*, vol. 16, pp. 1009–1010 (1983).
*Functional Monomers*, p. 686 (R. Yocum and E. Nyquist, EDS., Marcel Dekker, Publ. N.Y., N. Y., 1974).
*Chemical Abstracts*, 81:153109 (1974).
*Chemical Abstracts*; 116:217904 (1991).
*Chemical Abstracts*; 104:36787 (1985).
*Chemical Abstracts*; 102:169527 (1984).
*Chemical Abstracts*; 102:81502 (1984).
*Chemical Abstracts*; 100:69262 (1983).

*Primary Examiner*—Helen L. Pezzuto
(74) *Attorney, Agent, or Firm*—Stevens, Davis, Miller, Mosher, LLP

(57) ABSTRACT

A process of manufacturing a poly(dimethylaminoethyl (meth)acrylate) comprising polymerizing dimethylaminoethyl(meth)acrylate in water and in the presence of sufficient acid to form a solution having a pH of less than 6. The polymer is made in an aqueous medium and with a free radical initiator. The polymer is useful as a foam booster in a variety of formulations and applications.

28 Claims, No Drawings

PROCESS FOR MANUFACTURING HOMOPOLYMERS AND COPOLYMERS OF DIMETHYLAMINOETHYL(METH) ACRYLATE

CROSS-REFERENCE TO RELATED APPLICATIONS

This application claims priority from Ser. No. 60/103,100, filed Oct. 5, 1998 and Ser. No. 60/112,608 filed Dec. 17, 1998, the disclosures of which are incorporated by reference herein.

FIELD OF THE INVENTION

This invention relates to a process for manufacturing salts of polymers of dimethylaminoethyl(meth)acrylate which is particularly useful as a foam booster in shampoos, body washes, detergent formulations for dish washing or laundry, and in oilfield uses.

BACKGROUND OF THE INVENTION

Detergent compositions, e.g. liquid detergents, are well known. Typical applications include dish washing detergents, hand cleansers, and shampoos. Liquid detergents in particular have met with a high degree of acceptance due to their good cleaning performance and convenience of use.

Many detergent compositions, such as liquid hand dish washing detergents are comprised of two fundamental components, i.e. a surfactant base and a foam booster. The surfactant base, which usually consists of on or more anionic and/or nonionic surfactants, is largely responsible for the foam profile of the composition, i.e. initial copious foam height, volume, and density, and cleaning performance.

Liquid dish washing detergents can contain types of surfactants which are known to be more effective at removing specific types of soils. For example, anionic surfactants are known for their utility to remove carbohydrate and protein soils, while nonionic surfactants are especially useful for removing greasy and oily food soils. Mixtures of surfactants are commonly used to clean and remove complex soils which can be found on dishes and kitchen utensils.

For many detergents, especially liquid dish washing detergents, performance is commonly evaluated by the consumer in terms of the foaming and foam stability produced by the detergent. The consumer associates better performance with the presence of higher levels of foam and by foam that persists for extended periods of time even when exposed to various food soils. Dish detergent compositions on the market are designed to remove oily/greasy soils form glasses, dishes and other tableware and kitchen utensils while maintaining an acceptable level of foam. Consequently, there is an ongoing effort to make detergent compositions that clean and foam better and produce a more stable foam.

Foam boosters, which are also known as foam stabilizers or suds enhancers, are commonly used to prolong the persistence of the foam head generated during the dish washing process. Hand dish detergents are expected to produce copious amounts of foam in the presence of various food soils. Foam boosters provide the abundant, long-lasting foam that consumers perceive as being directly proportional to detersive utility.

SUMMARY OF THE INVENTION

This invention relates to a process of manufacturing a polymer having units derived from a salt of dimethylaminoethyl(meth)acrylate comprising polymerizing monomers comprised of dimethylaminoethyl(meth) acrylate in water and in the presence of sufficient acid to form a solution having a pH of less than 6.

DETAILED DESCRIPTION OF THE INVENTION

The homopolymers and copolymers of the present invention are prepared by subjecting dimethylaminoethyl(meth) acrylate, and one or more optional comonomers, in water, and in the presence of sufficient acid to form a solution having a pH of less than 6, to polymerization. Thus, it is necessary to first make a mixture of dimethylaminoethyl (meth)acrylate, water and a sufficient acid to form a solution having a pH of less than 6. Because the unionized form of dimethylaminoethyl(meth)acrylate tends to hydrolyze in water, it is preferred to dissolve the acid in water first to form an aqueous acid solution and to then add neat dimethylaminoethyl(meth)acrylate to the aqueous acid solution. While it is possible to first mix the monomer with water and then adjust the pH of the solution with acid, such a process will entail some hydrolysis of the monomer which could have been avoided.

The acid used to neutralize the dimethylaminoethyl(meth) acrylate may be a strong mineral acid, e.g. hydrochloric acid, sulfuric acid, or phosphoric acid, or it may be an organic acid, e.g. acetic or citric.

The amount of the acid used to neutralize the dimethylaminoethyl(meth)acrylate should be sufficient to produce an aqueous solution has a pH of less than 6, typically less than about 5.9, more typically less than about 5.8, and most typically less than about 5.7. Preferably, the pH of the solution will be less than about 5.5 and will preferably range from about 5.0 to about 5.5. The pH of the polymerization medium should be maintained at said pHs while there are significant amounts of the monomer present in the medium. In general, the acid will be added to the dimethylaminoethyl(meth)acrylate in a stoichiometric amount based on the molar amount of the acid. The control of pH avoids unnecessary loss of monomer as a result of hydrolysis thereof.

The weight ratio of dimethylaminoethyl(meth)acrylate monomer to citric acid will typically range from about 1:1 to about 2:1, more typically form about 1.3:1 to about 1.7:1, and most typically from about 1.4:1 to about 1.6:1. The amount of the monomer plus counter-ion in the polymerization medium will typically range from about 30% about 60%, more typically from about 35% to about 55%, and most typically from about 40% to about 50%.

A variety of comonomers can be used such as vinyl pyrrolidone, acrylamide, acrylic acid, vinyl acetate, methacrylic acid, acrylamidomethylpropanesulfonic acid, ethylenically unsaturated polyalkyleneoxy compounds (i.e. polymerizable surfactants such as "surfmers" such as polyoxyethylene(meth)acrylates and vinyl-benzyl ethers of polyalkoxylated fatty alcohols), and many cationic monomers (e.g. dimethylaminopropyl(meth)acrylamide and its methyl chloride/methyl sulfate quaternary versions) and mixtures thereof. Thus a variety of new polymers can be being made as illustrated immediately below.

The polymerization reaction is conducted in an oxygen-free environment, such as in the presence of an inert gas (e.g., helium, argon and the like), or nitrogen or with heating to drive off dissolved oxygen. The polymerization is carried out in an aqueous solvent, preferably water which is essentially free of organic solvents, e.g. lower alkanols such as methanol or ethanol. When essentially pure water is used as a solvent, the product will be essentially free of volatile organic compounds without the need to strip such compounds from the product.

Polymerization is initiated by making a mixture which comprises the aqueous solution of dimethylaminoethyl (meth)acrylate monomer and acid and a polymerization initiator. The initiators utilized are the usual free radical initiators. Examples include organic peresters (e.g., t-butyl peroxypivalate, t-amyl peroxypivalate, t-butyl peroxy-a-ethylhexanoate, and the like); organic azo compounds (e.g. azobisamidinopropanehydrochloride, azobisisobutyronitrile, azobis-2,4-dimethylvaleronitrile, and the like); inorganic and organic peroxides (e.g., hydrogen peroxide, benzyl peroxide, and butyl peroxide and the like), and redox imitators systems, e.g. those having oxidizing agents, such as persulfates (such as ammonium or alkali metal persulfate, and the like), chlorates and bromates (including inorganic or organic chlorates and/or bromates), reducing agents, such as sulfites and bisulfites (including inorganic and/or organic sulfites or bisulfites) oxalic acid, and ascorbic acid, and combinations thereof. The preferred initiators are water soluble. The most preferred initiators are sodium persulfate and azobisamidinopropanehydrochloride. Alternatively, initiation of polymerization can be instituted by irradiation with ultra-violet light. The amount of initiator utilized is in general a sufficient amount to effect initiation of polymerization. Preferably they are present in amounts ranging from about 0.001 to about 10% by weight of monomer and more preferably less than about 0.5% by weight based on the total weight of the monomer, and most preferably from about 0.005 to about 0.5% by weight based upon the weight of the monomer. The initiator is added in the polymerization either continuously or in incremental additions. The continuous or incremental addition of the initiator promotes the polymerization reaction. It is also important to insure high molecular weight polymer. Repeated contact of unreacted monomers with fresh initiator, particularly during the final stages of reaction when monomer concentration is greatly reduced, drives the reaction to completion. The gradual or incremental addition also promotes more efficient and conservative use of initiator while permitting a shorter overall reaction time.

The polymerization is conducted under reaction conditions effective to polymerize the dimethylaminoethyl(meth)acrylate monomer under an oxygen free atmosphere. Preferably, the reaction is conducted at a temperature ranging from about 30° C. to about 100° C. and more preferably from about 60° C. to about 90° C. The oxygen free atmosphere is maintained for the duration of the reaction, for example, the nitrogen purging is maintained throughout the reaction. The continuous purging of the reaction by constant ebullition of inert gas maintains the oxygen free atmosphere.

The preferred specific process of this invention is as follows. The process is begun by neutralizing dimethylaminoethyl(meth)acrylate with acetic or citric acid to a pH of 5.5 by adding the dimethylaminoethyl(meth)acrylate to an aqueous solution of acetic or citric acid forming an acetate or citrate salt of dimethylaminoethyl (meth)acrylate. Exotherm from neutralization will typically be observed thus cooling will be needed to maintain a temperature of less than 40° C. during neutralization.

The polymerization is then performed by adding simultaneously and separately the dimethylaminoethyl(meth)acrylate salt solution and sodium persulfate solutions over 150 minutes to water in a reactor at 85° C. under a nitrogen gas purge. The reaction medium is held at 85° C. for one hour and then a second portion of sodium persulfate initiator is added. Residual monomer level is then measured about 2 hours after addition of the second portion of initiator. A calculated amount of sodium metabisulfite will then be introduced, if necessary, to reduce/eliminate any unreacted monomer, if the measured monomer level is higher than 500 ppm (based on active, un-neutralized polymer). The total solids in the finished product will typically be about 46% and the active polymer will be about 27%. Typically, the bulk viscosity (LV, #4, 60 rpm, 25° C.) will be 2,000 to 6,000 cps, residual monomer will be less than 500 ppm, and the molecular weight (GPC) will be 100,000–250,000. In addition to residual monomer, there are also traces of by-products such as methacrylic acid and N,N-dimethylaminoethanol, due to practically unavoidable hydrolysis of monomer.

The resulting polymer will be useful as a foam booster in a variety of formulations and applications, e.g. in shampoos, body washes, detergent formulations for dish washing or laundry, and in oil field uses.

The resulting polymer of this invention will typically be formulated into a detergent composition. Such detergent compositions typically contain nonionic, anionic, amphoteric and/or zwitterionic surfactants. Typical detergent composition for liquid hand dish washing formulations typically include an anionic and/or nonionic surfactant. Examples of anionic surfactants include sulfates such as alkyl sulfate, preferably containing 10–20 carbon atoms, (e.g., lauryl sulfate), alkyl ether sulfate, preferably containing 10–40 carbon atoms (e.g., lauryl ether sulfate), alkylamide sulfates preferably containing 10–20 carbon atoms, alkyl arylpolyether sulfate preferably containing 10–20 carbon atoms, monoglyceride sulfates; sulfonates, e.g. alkyl sulfonate, preferably containing 10–20 carbon atoms, alkylamide sulfonates, preferably containing 10–20 carbon atoms, alkylaryl sulfonates preferably containing 10–40 carbon atoms and a-olefin sulfonates, preferably containing 10–20 carbon atoms; sulfosuccinic acid derivatives, e.g., alkyl ($C_{10}$–$C_{20}$) sulfosuccinates, alkyl ($C_{10}$–$C_{20}$) ether sulfosuccinates, alkyl ($C_{10}$–$C_{20}$) amide sulfosuccinates, and alkyl ($C_{10}$–$C_{20}$) amide polyether-sulfosuccinates; sarcosinates, e.g., ($C_8$–$C_{22}$) alkyl or ($C_8$–$C_{22}$) alkenyl sarcosinates; phosphate surfactants, e.g., alkyl ($C_{10}$–$C_{20}$) phosphates, or alkyl ($C_{10}$–$C_{20}$) ether phosphates, and the like. Examples of these ionic surfactants are described in U.S. Pat. No. 4,419,344 to Strasella, et al., the contents of which are incorporated by reference. If present, these ionic surfactants are preferably present in amounts ranging from about 0.1% to 5% by weight and more preferably from about 0.1% to 2% by weight.

Examples of nonionic surfactants include fatty acid alkanolamides, e.g., mono or diethanolamine adduct (lauric diethanolamide, coconut diethanolamide), amine oxides, and ethoxylated nonionics, e.g., ethoxylated forms of alkylphenols, fatty alcohols, fatty esters, and mono and diglycerides, and the like; these examples all contain preferably 10–22 carbon atoms. These are described in Kirk-Othmer, Encyclopedia of Chemical Technology, Vol. 12, p. 887, John Wiley and Sons, Inc. 1994 and U.S. Pat. No. 4,954,335 to Janchipraponvej; the contents of which are incorporated by reference. They are present in amounts ranging from 0.1% to about 5% by weight and more preferably from about 0.1 to about 2% by weight.

The amphoteric surfactants, also known as ampholytics, are both positively and negatively charged, and are usually derivatives of imidazolines or betaines, such as oleamidopropylbetaine and the like. They may also be associated with the homopolymer of the present invention in the hair conditioning compositions of the present invention. Sodium lauroamphoacetate may also be utilized in non-stinging shampoos. They are present in amounts ranging from about 0.1% to about 5% by weight and more preferably from about 0.1% to about 2% by weight.

All parts, percentages, ratios, averages, and the like expressed in this specification and the appended claims are by weight unless otherwise apparent in context. All numerical values in the summary of the invention and the detailed description should be read once as modified by the term about, and then alternatively as not so modified. All numerical values in the appended claims should be read as modified by the term "about".

EXAMPLES

Example 1

In the first vessel 272.80 parts of dimethylaminoethyl (meth)acrylate (DMAEMA) are added to 156.40 parts demineralized water and 208.40 parts acetic acid and the mixture is cooled during the addition of acid to maintain the temperature below 40° C. The pH of the resulting monomer solution is about 5.3. in a separate vessel 264.40 parts of demineralized water are added and heated to 65° C., purged with nitrogen and under agitation during the reaction. A solution of 4.92 parts sodium persulfate in 40.00 parts demineralized water and a solution of 2.72 parts sodium metabisulfite in 40.00 parts demineralized water are prepared. When the reaction vessel reaches 65° C. the persulfate, metabisulfite and the monomer solutions are added separately but simultaneously over 150 minutes. The reaction temperature is maintained at 65° C. during the additions. After the addition is complete, the vessel is maintained at 65° C. for one hour. A solution of 0.28 parts sodium persulfate in 2.40 parts demineralized water is added and the vessel held at 65° C. for another hour. Then, the vessel is cooled to 50° C. The residual DMAEMA and methacrylic acid (MMA) at this stage are typically 2,000 ppm and 50 ppm, respectively, based on the active polymer content. If desired the residual monomer can be further reduced by adding 0.56 parts sodium persulfate dissolved in 2.40 parts demineralized water and 0.72 parts sodium metabisulfite dissolved in 4.00 parts demineralized and the temperature maintained at 50° C. for 3 hours. Reaction vessel is then cooled to 25° C. The percentage non-volatile solids of the resulting polymer solution is about 29% and the viscosity of the material is typically about 2,300 cps as measured by a Brookfield Viscometer (LV #4, 60 rpm, 25° C.). The molecular weight ($M_w$) is typical of value about 128,000 as measured by GPC/MALLS. The sample is clear to slightly yellow and has pH about 4.5 The residual DMAEMA and MMA amounts at this stage are about 200 ppm and 10 ppm respectively.

Examples 2–18

Several polymers are prepared by similar method as in Example #1 with different reaction temperatures and initiator amounts. These samples are listed in Table #1. All the resulting polymer solutions are about 28 to 29% non-volatile solids and of viscosity between 600 cps and 4,100 cps as measured by a Brookfield Viscometer (LV #4, 60 rpm, 25° C.). The samples are clear to light yellow in appearance and typically have a pH about 4.5. The compositions are listed in parts by weight.

Example 19

In the first vessel 269.69 parts of dimethylaminoethyl (meth)acrylate (DMAEMA) are added to 266.40 parts demineralized water and 178.27 parts citric acid and the mixture is cooled during the addition to maintain the temperature below 40° C. The pH of the resulting monomer solution is about 5.2. In a separate vessel 223.57 parts of demineralized water are added and heated to 85° C., purged with nitrogen and under agitation. A solution of 5.73 parts sodium persulfate in 54.97 parts demineralized water is prepared. When the reaction vessel reaches 85° C., the initiator and the monomer solutions are added separately but simultaneously over 150 minutes. The reaction temperature is maintained at 85° C. during the additions. The batch is maintained at 85° C. for one hour following the addition is complete. A solution of 0.27 parts sodium persulfate in 1.10 parts demineralized water is added and the vessel held at 85° C. for another hour. After the hour, the vessel is cooled to 25° C. The residual DMAEMA and methacrylic acid (MMA) at this stage are typically 1,429 ppm and 399 ppm respectively based on the active polymer content. The percentage non-volatile solids of the resulting polymer solution is about 46% and the viscosity of the material is typically about 3,800 cps as measured by a Brookfield Viscometer (LV #4, 60 rpm, 25° C.). The polymer typically has a molecular weight ($M_w$) value of 130,000 as measured by GPC/MALLS. The sample is clear to slightly yellow and the pH is about 4.5.

Examples 20–22

Several polymers are prepared by similar method as in Example #19 except at different monomer pH or reaction temperatures. These samples are listed in Table #2. All the resulting polymer solutions are of about 43 to 46% non-volatile solids and of viscosity between 600 cps and 4,100 cps as measured by a Brookfield Viscometer (LV #4, 60 rpm, 25° C.). The samples are clear to light yellow. The samples prepared at lower pH have a lower amount of residual methacrylic acid (MMA) indicating less hydrolysis. Samples prepared at lower temperatures contain less residual monomer when all other variables are kept constant. The compositions are listed in parts by weight.

Examples 23–26

Several polymer samples are prepared by similar method as in Example #19 except a redox initiation system is used. The monomer solution, a sodium persulfate solution and a sodium metabisulfite solution are added to the reaction vessel simultaneously but separately during the polymerization stage. These samples are in Table #3. All the resulting polymer solutions are of about 43 to 47% non-volatile solids and of viscosity between 600 cps and 4,100 cps as measured by a Brookfield Viscometer (LV #4, 60 rpm, 25° C.). The samples are clear to light yellow. As stated the samples prepared at lower pH gave a lower amount of residual methacrylic acid (MMA) indicating less hydrolysis. Samples prepared at lower temperatures contain less residual monomer when all other variables are kept constant. The compositions are listed in parts by weight

Example 27

In the first vessel 345.78 parts of dimethylaminoethyl (meth)acrylate (DMAEMA) are added to 115.07 parts demineralized water and 101.33 parts concentrated sulphuric acid and the mixture is cooled during the addition to maintain the temperature below 40° C. The pH of the resulting monomer solution is about 5.2. In a separate vessel 362.12 parts of demineralized water are added and heated to 100° C., purged with nitrogen and under agitation during the reaction. A solution of 10.68 parts sodium persulfate in 61.71 parts demineralized water is prepared. When the reaction vessel reaches 100° C. the initiator solution and the monomer solution are added separately but simultaneously over 120 minutes. The reaction temperature is maintained at 100° C. during the additions. The vessel is maintained at 100° C. for one hour following the addition is complete. A solution of 0.35 parts sodium persulfate in 1.30 parts demineralized water is added and the vessel held at 100° C. for another hour. Then another portion of 0.35 parts sodium persulfate in 1.30 parts demineralized water is added and the vessel held at 100° C. for an extra hour. Then the batch is cooled to 25° C. The residual DMAEMA and methacrylic acid (MAA) at this stage are typically 1,600 ppm and 14 ppm respectively based on the active polymer content. The percentage non-volatile solids of the resulting polymer solution is about 46% and the viscosity of the material is typically about 1,900 cps as measured by a Brookfield Viscometer (LV #4, 60 rpm, 25° C.). The sample is clear yellow and the pH is about 2.4. The residual DMAEMA and MMA at this stage are typically 1,600 ppm and 14 ppm respectively.

Example 28

In the first vessel 234.62 parts of dimethylaminoethyl (meth)acrylate DMAEMA) are added to 308.95 parts demineralized water, 35.83 parts acrylic acid and 113.10 parts citric acid and the mixture is cooled during the addition of the acids to maintain the temperature below 40° C. The pH of the resulting monomer solution is about 5.2. In a separate vessel 237.17 parts of demineralized water are added and heated to 80° C., purged with nitrogen and under agitation during the reaction. A solution of 4.98 parts sodium persulfate in 63.75 parts demineralized water is prepared. When the reaction vessel reaches 80° C. the initiator solution and the monomer solution are added separately but simultaneously over 150 minutes. The reaction temperature is maintained at 80° C. during the additions. When the addition is complete, the vessel is maintained at 80° C. for one hour. A solution of 0.32 parts sodium persulfate in 1.27 parts demineralized water is added and the vessel is held at 80° C. for another hour. After the hour, the vessel is cooled to 25° C. The percentage non-volatile solids of the resulting polymer solution is about 39% and the viscosity of the material is typically about 2,200 cps as measured by a Brookfield Viscometer (LV #4, 60 rpm, 25° C.). Typically the molecular weight ($M_w$) is of 157,000 as measured by GPC/MALLS. The sample is clear to slightly yellow and the pH is about 4.5 The residual acrylic acid (AA) amount of this sample is not constant as measured and it will increase when the sample is heated.

Examples 29–32

Several polymer samples are prepared by similar method as in Example #28 except at different reaction temperatures and various amounts of initiator. These samples are listed in Table #3. All the resulting polymer solutions are of about 39% non-volatile solids and of viscosity between 900 cps and 11,000 cps as measured by a Brookfield Viscometer (LV #4, 60 rpm, 25° C.). The samples are clear to light yellow. The compositions are listed in parts by weight.

Examples 33–35

Several polymer samples are prepared by similar method as in Example #29 except that the monomer molar ratio of dimethylaminoethyl(meth)acrylate (DMAEMA) to acrylic acid (AA) is 2:1. These samples are listed in Table #4. All the resulting polymer solutions are of about 37% non-volatile solids and of viscosity ranging between 950 cps and 11,000 cps as measured by a Brookfield Viscometer (LV #4, 60 rpm, 25° C.). The samples are clear to light yellow. The compositions are listed in parts by weight.

Example 36

In the first vessel 228.75 parts of dimethylaminoethyl (meth)acrylate (DMAEMA) are added to 308.95 parts demineralized water, 41.70 parts methacrylic acid (MMA) and 113.10 parts citric acid and the mixture is cooled during the addition of acids to maintain the temperature below 40° C. The pH of the resulting monomer solution is about 5.2. In a separate vessel 237.17 parts of demineralized water are added and heated to 80° C., purged with nitrogen and under agitation during the reaction. A solution of 4.98 parts sodium persulfate in 63.75 parts demineralized water is prepared. When the reaction vessel reaches 80° C., the initiator and the monomer solutions are added separately but simultaneously over 150 minutes. The reaction temperature is maintained at 80° C. during the additions. After the addition is done, the vessel is maintained at 80° C. for one hour. A solution of 0.32 parts sodium persulfate in 1.28 parts demineralized water is added and the vessel held at 80° C. for another hour. Then, the vessel is cooled to 25° C. The percentage non-volatile solids of the resulting polymer solution is about 39% and the viscosity of the material is typically about 1,900 cps as measured by a Brookfield Viscometer (LV #4, 60 rpm, 25° C.). The residual DMAM and MAA at this stage are typically 900 ppm and 1,000 ppm, respectively. The amount of residual methacrylic acid does not change when the sample is heated as in the case with the acrylic acid copolymer samples.

Examples 37–38

Several polymer samples are prepared by similar method as in Example #36 except at different reaction temperatures and various amounts of initiator. These samples are listed in Table # 5. All the resulting polymer solutions are of about 39% non-volatile solids and of viscosity between 900 cps and 11,000 cps as measured by a Brookfield Viscometer (LV #4, 60 rpm, 25° C.). The samples are clear to light yellow. The compositions are listed in parts by weight.

Example 39

In the first vessel 243.93 parts of dimethylaminoethyl (meth)acrylate (DMAEMA) are added to 240.95 parts demineralized water and 161.30 parts citric acid and the mixture is cooled during the addition of acid to maintain the temperature below 40° C. The pH of the resulting monomer solution is about 5.2. In a separate vessel 231.55 parts of demineralized water are added and heated to 85° C., purged with nitrogen and under agitation during the reaction. A solution of 11.51 parts sodium persulfate in 55.24 parts demineralized water and a solution of 27.07 parts tridecyloxide-poly(ethylene oxide-co-propylene oxide) methacrylate ester in 27.07 parts demineralized water are prepared. When the reaction vessel reaches 85° C. the two monomer solutions and the initiator solution are added separately but simultaneously over 150 minutes. The reaction temperature is maintained at 85° C. during the additions. After the addition is done, the vessel is maintained at 85° C. for one hour. A solution of 0.28 parts sodium persulfate in 1.10 parts demineralized water is added and the vessel held at 85° C. for another hour. Then, the vessel is cooled to 25° C. The percentage non-volatile solids of the resulting polymer solution is about 45% and the viscosity of the material is typically about 1,700 cps as measured by a Brookfield Viscometer (LV #4, 60 rpm, 25° C.). The solution of the finish product is a slightly hazy light yellow.

Example 40

In the first vessel 243.93 parts of dimethylaminoethyl (meth)acrylate (DMAEMA) are added to 240.95 parts demineralized water and 161.30 parts citric acid and the mixture is cooled during the addition of acid to maintain the temperature below 40° C. The pH of the resulting monomer solution is about 5.2. In a separate vessel 231.55 parts of demineralized water are added and heated to 85° C., purged with nitrogen and under agitation during the reaction. A solution of 11.51 parts sodium persulfate in 55.24 parts demineralized water and a solution of 27.07 parts tridecyloxide-poly(ethylene oxide-co-propylene oxide) vinyl benzyl ether in 27.07 parts demineralized water are prepared. When the reaction vessel reaches 85° C. the two monomer solutions and the initiator solution are added separately but simultaneously over 150 minutes. The reaction temperature is maintained at 85° C. during the additions. After the addition is done, the vessel is maintained at 85° C. for one hour. A solution of 0.28 parts sodium persulfate in 1.10 parts demineralized water is added and the vessel held at 85° C. for another hour. Then, the vessel is cooled to 25° C. The percentage non-volatile solids of the resulting polymer solution is about 45% and the viscosity of the material is typically about 1,700 cps as measured by a Brookfield Viscometer (LV #4, 60 rpm, 25° C.). The sample is a slightly hazy light yellow solution.

Example 41

In the first vessel 234.69 parts of dimethylaminoethyl (meth)acrylate (DMAEMA) are added to 273.72 parts demineralized water and 155.10 parts citric acid and the mixture is cooled during the addition of acid to maintain the temperature below 40° C. The pH of the resulting monomer solution is about 5.2. A solution of 35.33 parts acrylamide in 35.33 parts demineralized water is added to the monomer solution and mixed until the solution is homogenous. In a separate vessel 195.37 parts of demineralized water and 0.10 parts EDTA are added and heated to 80° C., purged with nitrogen and under agitation during the reaction. A solution of 4.99 parts sodium persulfate in 63.77 parts demineralized water is prepared. When the reaction vessel reaches 80° C. the initiator and the monomer solutions are added separately but simultaneously over 150 minutes. The reaction temperature is maintained at 80° C. during the additions. Following the additions, the vessel is maintained at 80° C. for one hour. A solution of 0.32 parts sodium persulfate in 1.28 parts demineralized water is added and the vessel held at 80° C. for another hour. Then, the vessel is cooled to 25° C. The percentage non-volatile solids of the resulting polymer solution is about 43% and the viscosity of the material is typically about 8,000 cps as measured by a Brookfield Viscometer (LV #4, 60 rpm, 25° C.). The sample is clear to slightly yellow and the pH is about 4.5.

Example 42

In the first vessel 168.21 parts of dimethylaminoethyl (meth)acrylate (DMAEMA) are added to 240.76 parts demineralized water and 111.21 parts citric acid and the mixture is cooled during the addition of acid to maintain the temperature below 40° C. The pH of the resulting monomer solution is about 5.2. A solution of 102.26 parts dimethylaminopropylmethacrylamide quarternized with sodium monochloroacetate in 68.17 parts demineralized water is added to the monomer solution and mixed until the solution is homogenous. In a separate vessel 240.76 parts of demineralized water is added and heated to 80° C., purged with nitrogen and agitated during the reaction. A solution of 4.99 parts sodium persulfate in 63.77 parts demineralized water is prepared. When the reaction vessel reaches 80° C., the initiator and the monomer solutions are added separately but simultaneously over 150 minutes. The reaction temperature is maintained at 80° C. during the additions. After the addition is complete, the vessel is maintained at 80° C. for one hour. A solution of 0.32 parts sodium persulfate in 1.22 parts demineralized water is added and the vessel held at 80° C. for another hour. Then, the vessel is cooled to 250° C. The percentage non-volatile solids of the resulting polymer solution is about 43% and the viscosity of the material is typically about 930 cps as measured by a Brookfield Viscometer (LV #4, 60 rpm, 25° C.). The sample is clear to slightly yellow and the pH is about 4.5.

Example 43

In the first vessel 187.09 parts of dimethylaminoethyl (meth)acrylate (DMAEMA) are added to 308.97 parts demineralized water and 123.65 parts citric acid and the mixture is cooled during the addition of acid to maintain the temperature below 40° C. The pH of the resulting monomer solution is about 5.2. To the monomer solution 83.32 parts of polyethylene glycol monomethacrylate (EO=6), tradenamed as Bisomer PEM6, is added and mixed well until a homogenous solution is achieved. In a separate vessel 226.64 parts of demineralized is added and heated to 80° C., purged with nitrogen and under agitation during the reaction. A solution of 4.99 parts sodium persulfate in 63.77 parts demineralized water is prepared. When the reaction vessel reaches 80° C., the initiator and the monomer solutions are added separately but simultaneously over 150 minutes. The reaction temperature is maintained at 80° C. during the additions. The vessel is maintained at 80° C. for one hour following the additions. A solution of 0.32 parts sodium persulfate in 1.28 parts demineralized water is added and the vessel held at 80° C. for another hour. After the hour, the vessel is cooled to 25° C. The percentage non-volatile solids of the resulting polymer solution is about 43% and the solution viscosity of the finish product is typically about 3,300 cps as measured by a Brookfield Viscometer (LV #4, 60 rpm, 25° C.). The sample is clear to slightly yellow and the pH is about 4.5.

TABLE 1

| EXAMPLE NO. | PARTS $H_2O$ | PARTS ACETIC ACID | PARTS DMAEMA | PARTS 1ST $Na_2S_2O_8$ | PARTS $Na_2S_2O_6$ | PARTS 2ND $Na_2S_2O_8$ | REACTION TEMP. | B.V. (as is) (cps) | DMAEMA (ppm) | MAA (ppm) |
|---|---|---|---|---|---|---|---|---|---|---|
| Example #2 | 519.63 | 205.93 | 269.84 | 4.32 | 0.00 | 0.28 | 95° C. | 2,150 | 20,700 | 2,980 |
| Example #3 | 519.63 | 205.93 | 269.84 | 4.32 | 0.00 | 0.28 | 90° C. | 3,350 | 16,000 | 1,600 |
| Example #4 | 519.36 | 205.82 | 269.70 | 4.85 | 0.00 | 0.27 | 90° C. | 3,100 | 10,600 | 1,500 |
| Example #5 | 519.36 | 205.82 | 269.70 | 4.85 | 0.00 | 0.27 | 85° C. | 3,550 | 10,400 | 840 |
| Example #6 | 517.86 | 205.77 | 269.63 | 6.47 | 0.00 | 0.27 | 85° C. | 2,700 | 7,522 | 651 |
| Example #7 | 517.81 | 205.22 | 268.91 | 7.79 | 0.00 | 0.27 | 85° C. | 2,140 | 10,246 | 869 |
| Example #8 | 511.43 | 208.05 | 272.62 | 4.91 | 2.72 | 0.27 | 80° C. | 2,500 | 5,468 | 293 |
| Example #9 | 508.70 | 208.05 | 272.62 | 4.91 | 5.45 | 0.27 | 80° C. | 600 | 7,378 | 399 |
| Example #10 | 512.11 | 208.34 | 273.00 | 4.91 | 1.36 | 0.28 | 75° C. | 3,650 | 5,681 | 153 |
| Example #11 | 511.42 | 208.05 | 272.62 | 4.91 | 2.72 | 0.27 | 75° C. | 2,050 | 4,180 | 88 |
| Example #12 | 508.70 | 208.05 | 272.62 | 4.91 | 5.45 | 0.27 | 75° C. | 600 | 5,468 | 293 |
| Example #13 | 510.79 | 208.91 | 273.74 | 4.92 | 1.36 | 0.28 | 65° C. | 5,800 | 2,307 | 33 |
| Example #14 | 509.12 | 209.45 | 274.16 | 4.94 | 2.05 | 0.28 | 65° C. | 320 ?? | 1,638 | 29 |
| Example #15 | 508.70 | 208.05 | 272.62 | 4.91 | 5.45 | 0.28 | 65° C. | 800 | 1,033 | Not detected |
| Example #16 | 513.26 | 207.68 | 271.84 | 4.90 | 2.04 | 0.28 | 60° C. | 3,400 | 1,589 | 21 |
| Example #17 | 506.54 | 210.54 | 275.61 | 4.97 | 2.06 | 0.28 | 55° C. | 4,100 | 1,474 | 9 |
| Example #18 | 508.58 | 209.38 | 274.08 | 4.94 | 2.74 | 0.28 | 55° C. | 3,050 | 521 | 3 |

TABLE 2

| EXAMPLE NO. | PARTS $H_2O$ | PARTS CITRIC | PARTS DMAEMA | PARTS 1ST $Na_2S_2O_8$ | PARTS 2ND $Na_2S_2O_8$ | REACTION TEMP. | MONOMER pH | B.V. (as is) (cps) | pH | DMAEMA (ppm) | MAA (ppm) |
|---|---|---|---|---|---|---|---|---|---|---|---|
| Example #20 | 563.14 | 148.85 | 281.74 | 5.98 | 0.29 | 85° C. | 6.02 | 8,600 | 5.13 | 2,279 | 1,968 |
| Example #21 | 563.14 | 148.85 | 281.74 | 5.98 | 0.29 | 75° C. | 6.01 | 11,600 | 5.15 | 1,192 | 775 |
| Example #22 | 546.04 | 178.27 | 269.69 | 5.73 | 0.27 | 75° C. | 5.21 | 10,800 | 4.46 | 667.2 | 159 |

TABLE 3

| EXAMPLE NO. | PARTS $H_2O$ | PARTS CITRIC | PARTS DMAEMA | PARTS $Na_2S_2O_8$ | PARTS $Na_2S_2O_8$ | REACTION TEMP. | MONOMER pH | B.V. (as is) (cps) | pH | DMAEMA (ppm) | MAA (ppm) |
|---|---|---|---|---|---|---|---|---|---|---|---|
| Example #23 | 570.12 | 115.12 | 292.33 | 6.21 | 16.22 | 85° C. | 7.05 | 3,500 | 5.94 | 433 | 3,945 |
| Example #24 | 548.32 | 146.68 | 281.41 | 5.98 | 15.61 | 85° C. | 6.02 | 600 | 5.15 | 2,193 | 1,230 |
| Example #25 | 531.44 | 176.56 | 271.19 | 5.76 | 15.05 | 85° C. | 5.19 | 250 | 4.52 | 944 | 331 |
| Example #26 | 531.44 | 176.56 | 271.19 | 5.76 | 15.05 | 75° C. | 5.19 | 500 | 4.51 | 5 | 17 |

TABLE 4

| EXAMPLE NO. | PARTS $H_2O$ | PARTS CITRIC | PARTS DMAEMA | PARTS AA | PARTS 1ST $Na_2S_2O_8$ | PARTS 2ND $Na_2S_2O_8$ | REACTION TEMP. | B.V. (AsIs) (cps) | pH | DMAEMA (ppm) | MAA (ppm) |
|---|---|---|---|---|---|---|---|---|---|---|---|
| Example #29 | 612.86 | 113.41 | 235.27 | 35.93 | 2.21 | 0.32 | 75° C. | 11,000 | 4.48 | | |
| Example #30 | 612.16 | 113.29 | 235.01 | 35.89 | 3.33 | 0.32 | 75° C. | 6,500 | 4.48 | | |
| Example #31 | 611.47 | 113.10 | 234.62 | 35.83 | 4.98 | 0.32 | 75° C. | 3,200 | 4.48 | | |
| Example #32 | 610.15 | 112.91 | 234.22 | 35.77 | 6.63 | 0.32 | 85° C. | 900 | 4.46 | | |

TABLE 5

| EXAMPLE NO. | PARTS $H_2O$ | PARTS CITRIC | PARTS DMAEMA | PARTS AA | PARTS 1ST $Na_2S_2O_8$ | PARTS 2ND $Na_2S_2O_8$ | | B.V. (as is) (cps) | pH | DMAEMA (ppm) | MAA (ppm) |
|---|---|---|---|---|---|---|---|---|---|---|---|
| Example #37 | 611.14 | 113.10 | 228.75 | 41.70 | 4.99 | 0.32 | 75° C. | 2,580 | | 620 | 983 |
| Example #38 | 615.39 | 113.41 | 229.39 | 41.81 | 2.22 | 0.32 | 80° C. | 6,650 | | 346 | 993 |

What is claimed is:

1. A process of manufacturing a polymer having units derived from a salt of dimethylaminoethyl(meth)aciylate, said process comprising polymerizing monomers comprising dimethylaminoethyl(meth)acrylate in water and in the presence of sufficient acetic acid to form a solution having a pH of less than 6, said solution having a pH of less than 6 being capable of preventing hydrolysis of said monomer.

2. A process of manufacturing a polymer having units derived from a salt of dimethylaminoethyl(meth)acrylate, said process comprising polymerizing monomers comprising dimethylaminoethyl(meth)acrylate in water and in the presence of sufficient acetic acid to form a solution having a pH of less than 6.

3. A process as claimed in claim 2 wherein said pH is less than about 5.9.

4. A process as claimed in claim 2 wherein said pH is less than about 5.8.

5. A process as claimed in claim 2 wherein said pH is less than about 5.7.

6. A process as claimed in claim 2 wherein said pH is less than about 5.5.

7. A process as claimed in claim 2 wherein said pH is from about 5.0 to about 5.5.

8. A process as claimed in claim 2 wherein the pH of the polymerization medium is maintained at said pH while there is more than about 500 ppm of dimethylaminoethyl(meth)acrylate present in the medium.

9. A process as claimed in claim 2 wherein the amount of monomers in the polymerization medium is from about 30% to about 60%.

10. A process as claimed in claim 2 wherein the amount of monomers in the polymerization medium is from about 40% to about 50%.

11. A process as claimed in claim 2 wherein said water is essentially free of organic solvents.

12. A process as claimed in claim 2 wherein said acid is dissolved in said water prior to mixing of said water with said dimethylaminoethyl(meth)acrylate.

13. A process as claimed in claim 2 wherein said polymer is a homopolymer.

14. A process as claimed in claim 2 wherein said polymer is a copolymer.

15. A process of manufacturing a polymer having units derived from a salt of dimethylaminoethyl(meth)acrylate, said process comprising polymerizing monomers comprising dimethylaminoethyl(meth)acrylate in water and in the presence of sufficient citric acid to form a solution having a pH of less than 6.

16. A process as claimed in claim 15 wherein said pH is less than about 5.9.

17. A process as claimed in claim 15 wherein said pH is less than about 5.8.

18. A process as claimed in claim 15 wherein said pH is less than about 5.7.

19. A process as claimed in claim 15 wherein said pH is less than about 5.5.

20. A process as claimed in claim 15 wherein said pH is from about 5.0 to about 5.5.

21. A process as claimed in claim 15 wherein the pH of the polymerization medium is maintained at said pH while there is more than about 500 ppm of dimethylaminoethyl (meth)acrylate present in the medium.

22. A process as claimed in claim 15 wherein the amount of monomers in the polymerization medium is from about 30% to about 60%.

23. A process as claimed in claim 15 wherein the amount of monomers in the polymerization medium is from about 40% to about 50%.

24. A process as claimed in claim 15 wherein said water is essentially free of organic solvents.

25. A process as claimed in claim 15 wherein said acid is dissolved in said water prior to mixing of said water with said dimethylaminoethyl(meth)acrylate.

26. A process as claimed in claim 15 wherein said polymer is a homopolymer.

27. A process as claimed in claim 15 wherein said polymer is a copolymer.

28. A process of manufacturing a polymer having units derived from a salt of dimethylaminoethyl(meth)acrylate, said process comprising polymerizing monomers comprising dimethylaminoethyl(meth)acrylate in water and in the presence of sufficient citric acid to form a solution having a pH of less than 6, said solution having a pH of less than 6 being capable of preventing hydrolysis of said monomer.

* * * * *